United States Patent
Vorobyov et al.

(10) Patent No.: US 11,860,679 B2
(45) Date of Patent: Jan. 2, 2024

(54) DETECTING SECURITY VULNERABILITIES IN QUERIES VIA AN INFORMATION FLOW GRAPH

(71) Applicant: Oracle International Corporation, Redwood Shores, CA (US)

(72) Inventors: Kostyantyn Vorobyov, Brisbane (AU); Padmanabhan Krishnan, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 262 days.

(21) Appl. No.: 17/539,136

(22) Filed: Nov. 30, 2021

(65) Prior Publication Data

US 2023/0169180 A1  Jun. 1, 2023

(51) Int. Cl.
*G06F 21/57* (2013.01)
*G06F 8/41* (2018.01)

(52) U.S. Cl.
CPC .......... *G06F 21/577* (2013.01); *G06F 8/427* (2013.01); *G06F 2221/033* (2013.01)

(58) Field of Classification Search
CPC .. G06F 21/577; G06F 8/427; G06F 2221/033; G06F 8/75; G06F 21/563
See application file for complete search history.

(56) References Cited

U.S. PATENT DOCUMENTS

| | | | | |
|---|---|---|---|---|
| 8,225,402 | B1 * | 7/2012 | Averbuch | H04L 63/14 726/22 |
| 2014/0283096 | A1 * | 9/2014 | Neerumalla | G06F 21/10 726/26 |
| 2017/0068819 | A1 * | 3/2017 | Anand | G06F 21/577 |
| 2020/0159934 | A1 * | 5/2020 | Yamaguchi | G06F 16/31 |
| 2023/0169180 | A1 * | 6/2023 | Vorobyov | G06F 21/563 726/25 |
| 2023/0267203 | A1 * | 8/2023 | Vorobyov | G06F 21/566 726/23 |

FOREIGN PATENT DOCUMENTS

| | | | | | |
|---|---|---|---|---|---|
| CN | 107292170 | A * | 10/2017 | | G06F 21/563 |
| CN | 109670307 | A * | 4/2019 | | G06F 21/563 |
| EP | 3401827 | A1 * | 11/2018 | | G06F 11/08 |

OTHER PUBLICATIONS

E. Bertino, et al., "Profiling Database Application to Detect SQL Injection Attacks", In IEEE International Performance, Computing, and Communications Conference, Dec. 23, 2020, 10 pages.

(Continued)

*Primary Examiner* — Meng Li
(74) *Attorney, Agent, or Firm* — Ferguson Braswell Fraser Kubasta PC (57) ABSTRACT

A method for detecting a security vulnerability in code may include obtaining (i) a permitted information flow graph for a permitted query and (ii) a target information flow graph for a target query in the code, determining, by traversing the permitted information flow graph, a permitted information flow including permitted disclosed columns, permitted accessed columns, and a permitted predicate, determining, by traversing the target information flow graph, a target information flow including target disclosed columns, target (Continued)

```
                    Outermost
                    SELECT
                    Statement                Example Query
                    402                      400
                        ↘ SELECT            ↙
                            T1.a, X.x, X.y
                        FROM
                            T1
          Innermost
          SELECT       LEFT JOIN (
          Statement
          404 ──────→ SELECT
                            T2.b AS x, T3.c AS y
                        FROM
                            T2
                            LEFT JOIN
                            T3
                            ON x = y
                    ) AS X
                    ON T1.a = X.x
``` accessed columns, and a target predicate, comparing the permitted information flow and the target information flow to obtain a comparison result, and determining, based on the comparison result, that the target query includes the security vulnerability.

20 Claims, 8 Drawing Sheets

(56) References Cited

OTHER PUBLICATIONS

Chu, S., et al., "Axiomatic Foundations and Algorithms for Deciding Semantic Equivalences of SQL Queries", VLDB, Feb. 6, 2018, 14 pages.
Cohen, S., Equivalence of Queries Combining Set and Bag-Set Semantics, Jun. 26-28, 2006, 10 pages.
de Moura, L., et al., "Z3: An Efficient SMT Solver", Mar. 1, 2008, 4 pages.
Guarnieri, M., et al., "Information-Flow Control for Database-backed Applications", IEEE European Symposium on Security and Privacy, Aug. 22, 2019, 16 pages.
Kul, G., et al., "Similarity Metrics for SQL Query Clustering", IEEE, Dec. 1, 2018, 13 pages.
Nielson, F., et al., "Principles of Program Analysis", Springer, Jan. 1, 1999, 482 pages.
Staicu, C., et al., "SYNODE: Understanding and Automatically Preventing Injection Attacks on NODE.JS", Feb. 18-21, 2018, 15 pages.
Wang, C. et al., "Synthesizing Highly Expressive SQL Queries from Input-Output Examples", Jun. 18-23, 2017, 15 pages.

* cited by examiner

FIG. 1A

Multi-Column
Information Flows
150

FIG. 1B

Single-Column
Information Flows
160

Outermost SELECT Statement 402

Example Query 400

Innermost SELECT Statement 404

```
SELECT
    T1.a, X.x, X.y
FROM
    T1
    LEFT JOIN (
        SELECT
            T2.b AS x, T3.c AS y
        FROM
            T2
            LEFT JOIN
            T3
            ON x = y
    ) AS X
    ON T1.a = X.x
```

FIG. 4A

Example Information Flow Graph 420

Outermost SELECT Node 422 — O(X.x),O(X.y),O(T1.a)

Table T1 Node 424

Table X Node 426

Predicate B Node 428B — T1.a = X.x

A(X.x),A(X.y)

Innermost Join Node 430

Table T3 Node 434

Table T2 Node 432

Predicate A Node 428A — X.x = X.y

DETECTING SECURITY VULNERABILITIES IN QUERIES VIA AN INFORMATION FLOW GRAPH

BACKGROUND

Applications that use query language (e.g., Structured Query Language, or SQL) statements may become vulnerable when attacker-controlled inputs flow to the query language statements. For example, query language injections may occur when an attacker causes a query language statement to extract sensitive data, to compromise data integrity, or cause denial of service. Although defenses against query language injection exist, the complexity of software applications often means that applications remain vulnerable to query language injection attacks. One way to prevent query language injection is to identify and prevent the execution of malicious queries at runtime.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for detecting a security vulnerability in code, including obtaining (i) a permitted information flow graph for a permitted query and (ii) a target information flow graph for a target query in the code, determining, by traversing the permitted information flow graph, a permitted information flow including permitted disclosed columns, permitted accessed columns, and a permitted predicate, determining, by traversing the target information flow graph, a target information flow including target disclosed columns, target accessed columns, and a target predicate, comparing the permitted information flow and the target information flow to obtain a comparison result, and determining, based on the comparison result, that the target query includes the security vulnerability.

In general, in one aspect, one or more embodiments relate to a system for detecting a security vulnerability in code, including a repository configured to store a permitted information flow graph, a permitted information flow including permitted disclosed columns, permitted accessed columns, and a permitted predicate, and a target information flow including target disclosed columns, target accessed columns, and a target predicate. The system further includes a computer processor and a query analyzer executing on the computer processor and configured to determine, by traversing the permitted information flow graph, the permitted information flow, determine, by traversing the target information flow graph, the target information flow, compare the permitted information flow and the target information flow to obtain a comparison result, and determine, based on the comparison result, that the target query includes the security vulnerability.

In general, in one aspect, one or more embodiments relate to a method for detecting a security vulnerability in code, including sending a target query in the code to a query analyzer configured to perform: obtaining (i) a permitted information flow graph for a permitted query and (ii) a target information flow graph for a target query in the code, determining, by traversing the permitted information flow graph, a permitted information flow including permitted disclosed columns, permitted accessed columns, and a permitted predicate, determining, by traversing the target information flow graph, a target information flow including target disclosed columns, target accessed columns, and a target predicate, comparing the permitted information flow and the target information flow to obtain a comparison result, making a determination, based on the comparison result, that the target query includes the security vulnerability, and transmitting the determination that the target query comprises the security vulnerability. The method further includes receiving, from the query analyzer, the determination that the target query comprises the security vulnerability.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of the invention are directed to detecting a security vulnerability. The disclosed invention prevents the execution of malicious queries at runtime based on comparing information flows of a target query and a permitted query. The permitted query is a query that is known to be benign. That is, the permitted query does not include a security vulnerability. A target query is considered to be benign when the target query releases no more information than the information released by the permitted query. Otherwise, if the target query releases more information than the information released by the permitted query, the target query may be flagged as a malicious query that includes a potential security vulnerability such as a query language injection.

The information flow is derived from an information flow graph that represents the relevant structural semantics of a query. The semantics of the query may be represented in terms of the directionality of edges connecting nodes of different types in the information flow graph. An information flow has three components: information that is disclosed, information that is accessed for the disclosure to occur, and a predicate representing the conditions under which the access and disclosure occur.

Figure 1A:
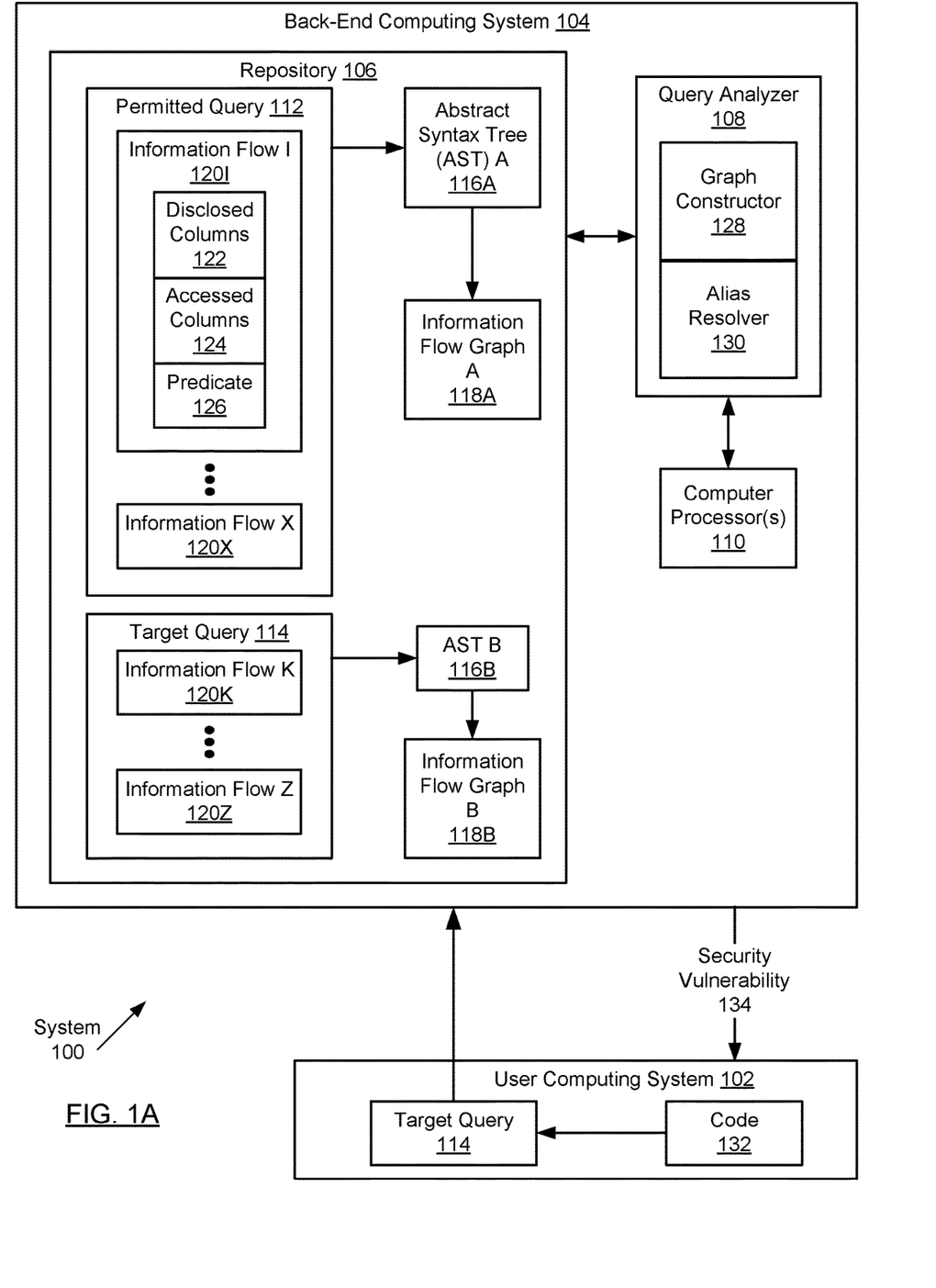
FIG. 1A, FIG. 1B, and FIG. 1C show a system in accordance with one or more embodiments of the invention.

FIG. 1A shows a system (100) in accordance with one or more embodiments of the invention. As shown in FIG. 1A, the system (100) includes a user computing system (102) and a back-end computing system (104). In one or more embodiments, the user computing system (102) and the back-end computing system (104) take the form of the computing system (500) described with respect to FIG. 5A and the accompanying description below or take the form of the client device (526) described with respect to FIG. 5B. The back-end computing system (104) includes a repository (106), a query analyzer (108), and computer processor(s) (110).

In one or more embodiments, the repository (106) is any type of storage unit and/or device (e.g., a file system, database, collection of tables, or any other storage mechanism) for storing data. Further, the repository (106) may include multiple different storage units and/or devices. The multiple different storage units and/or devices may or may not be of the same type or located at the same physical site. The repository (106) may be accessed online via a cloud service (e.g., Oracle Cloud, Amazon Web Services (AWS), Egnyte, Azure, etc.).

In one or more embodiments, the repository (106) includes functionality to store a permitted query (112), a target query (114), abstract syntax trees (ASTs) (116A, 116B), and information flow graphs (118A, 118B). The permitted query (112) and the target query (114) may be represented in a query language, such as the Structured Query Language (SQL).

The permitted query (112) includes one or more information flows (120I, 120X). Similarly, the target query (114) includes one or more information flows (120K, 120Z). An information flow (e.g., information flow (120I)) describes a flow of information through a query in terms of one or more disclosed columns (122), one or more accessed columns (124), and a predicate (126). Each column may be a column (e.g., a field) of a table in a database. Each column includes a column identifier (e.g., a field name).

A disclosed column (122) is a column whose value(s) are included in the results of the query. An accessed column (124) is a column whose value(s) are accessed (e.g., read) by the query. A disclosed column (122) is also an accessed column (124) because the disclosed column (122) is accessed in order to be disclosed. A predicate (126) is a Boolean expression that determines which value(s) of the disclosed columns (122) are disclosed and which value(s) of the accessed columns (124) are accessed. For example, a predicate (126) may include a WHERE, ON, or HAVING clause in an SQL statement. A query (e.g., the permitted query (112) or the target query (114)) may disclose values of the disclosed columns (122) and access values of the accessed columns (124) when the predicate (126) is satisfied. The result of executing a query may be one or more rows (e.g., records). The rows may be included in a table. An example of a query is: SELECT a, b from T WHERE c=1 AND d>5, where columns a and b from table T are disclosed columns, columns c and d are accessed columns (in addition to columns a and b), and the predicate is the Boolean expression c=1 AND d>5.

The permitted query (112) may be a query that is known to be benign (e.g., safe to execute). For example, the permitted query (112) may be known not to include a security vulnerability. The target query (114) may be a query that is generated by executing code (132).

The target query (114) may be considered benign when the target query (114) has no more information than the permitted query (112). Conversely, the target query (114) may be considered malicious (e.g., the target query (114) may include a security vulnerability), when the target query (114) has more information than the permitted query (112). The target query (114) has no more information than the permitted query (112) when the following information flow security criteria are satisfied:

1) the disclosed columns of the target query (114) are a subset of the disclosed columns of the permitted query (112),
2) the accessed columns of the target query (114) are a subset of the accessed columns of the permitted query (112), and
3) the predicate of the target query (114) implies the predicate of the permitted query (112).

A query may refer to a table or a column by an alternate identifier, called an alias. For example, in the example query (400) shown in FIG. 4A, the derived table returned by executing the innermost SELECT statement (404) is aliased as "X," as indicated by the clause "AS X." FIG. 4A further shows that the innermost SELECT statement (404) aliases the column identifier T2.b as "x" and aliases the column identifier T3.c as "y."

A "parent" query may include one or more sub-queries. The results of the parent query may be formed by joining the results of the sub-queries. For example, the results of (e.g., rows returned by) the sub-queries may be joined via an SQL JOIN statement. A query may join rows from two or more tables, based on a related column shared between the two or more tables. Rows from two tables, referred to as the "left table" and the "right table," may be joined in at least the following ways, corresponding to at least four types of joins:

1) inner join: the result includes rows that have matching values of the shared column in both the left and right tables;
2) left join: the result includes all the rows of the left table and rows of the right table with matching values of the shared column;
3) right join: the result includes all the rows of the right table and rows of the left table with matching values of the shared column;
4) full join: the result includes all the rows of the left table and all the rows of the right table and rows of the left table when there is a matching value of the shared column in either the left table or the right table.

An abstract syntax tree (AST) (e.g., 116A, 116B) is a tree representation of a query. For example, abstract syntax tree A (116A) is a tree representation of the permitted query (112). Similarly, abstract syntax tree B (116B) is a tree representation of the target query (114). An abstract syntax tree includes abstract syntax tree (AST) nodes corresponding to syntactic constructs of the query. The abstract syntax tree is "abstract" in the sense that the AST nodes correspond to structural and/or content-related details of the query while omitting one or more syntactic details of the query. For example, because grouping parentheses are implicit in the tree structure of the abstract syntax tree, the abstract syntax tree may omit AST nodes corresponding to the grouping parentheses.

In one or more embodiments, an information flow graph (e.g., 118A, 118B) is a semantic generalization of an abstract syntax tree (e.g., 116A, 116B). That is, the information flow graph may omit one or more details of the query represented in the abstract syntax tree that do not impact the information flow. An information flow graph (e.g., 118A, 118B) includes nodes each corresponding to a component of a query, and edges each connecting a pair of nodes.

In one or more embodiments, each node has a node type. The node type may be based on a component of the query corresponding to the node. Thus, the node type represents semantic information about the query. For example, the semantic information may be defined by a query language (e.g., Structured Query Language (SQL)). Continuing this example, the node type may be: table, statement, predicate, alias, etc. Further continuing this example, the predicate node type may correspond to a predicate clause in an SQL statement. The predicate node type may be further differentiated as a type of predicate clause, such as WHERE, ON, HAVING, etc. As another example, the statement node type may be further differentiated as a type of statement, such as SELECT, UPDATE, DELETE, JOIN, etc. Continuing this example, the JOIN node type may be further differentiated as a type of JOIN, such as INNER JOIN, LEFT JOIN, RIGHT JOIN, FULL JOIN, etc. As yet another example, the alias node type may correspond to an AS clause.

Figure 4A:
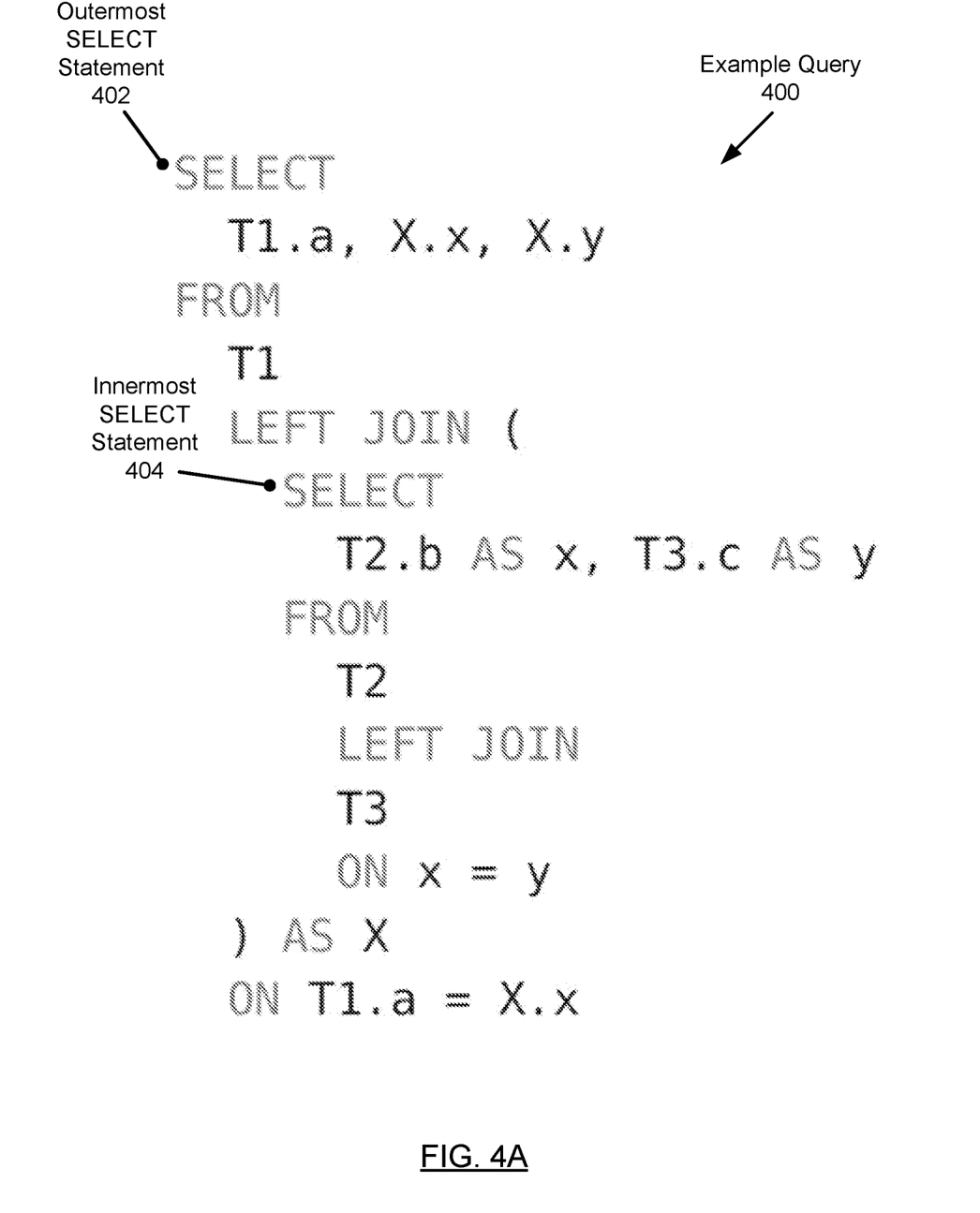
FIG. 4A, FIG. 4B, FIG. 4C, FIG. 4D, and FIG. 4E show examples in accordance with one or more embodiments of the invention.
Figure 4B:
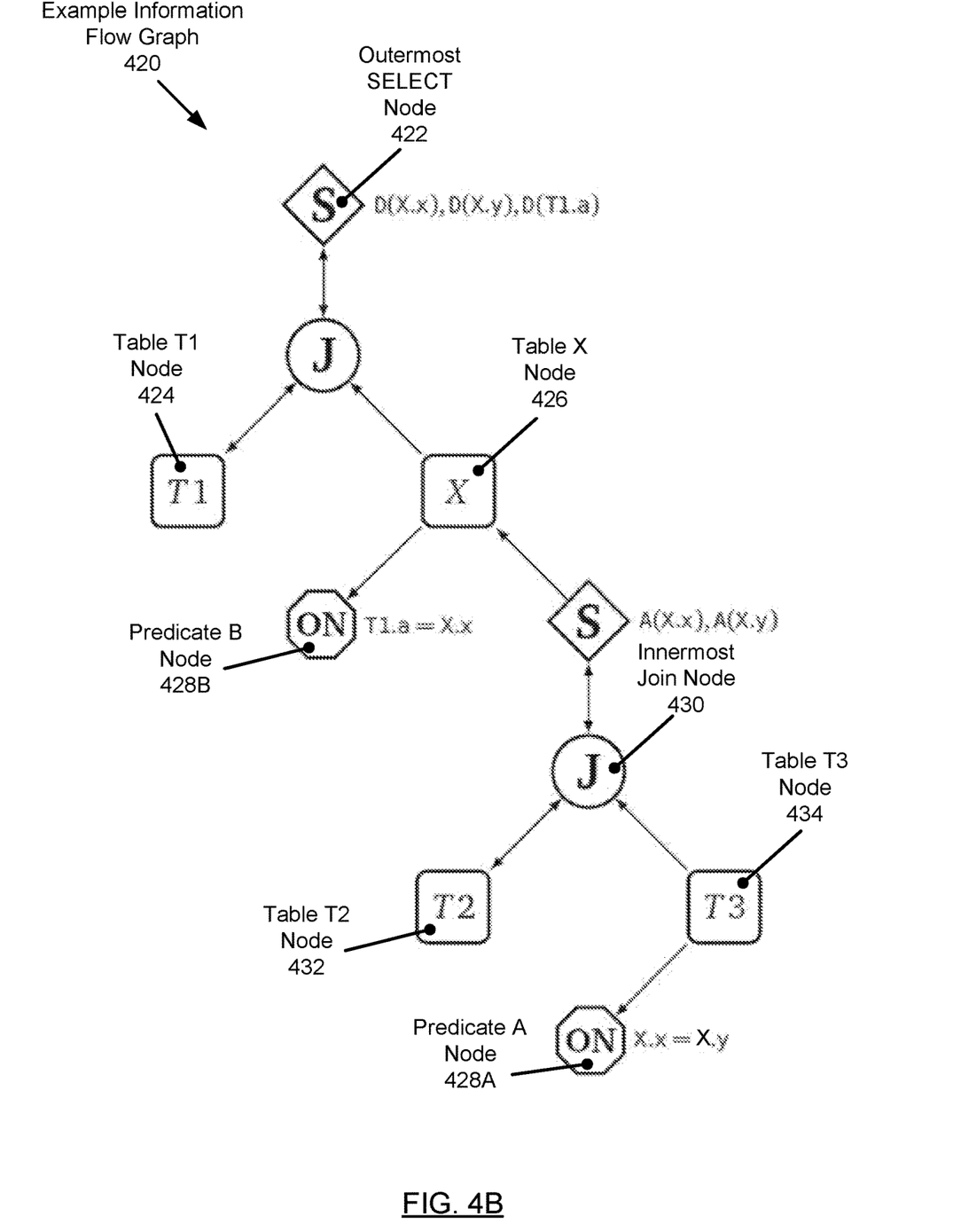

An edge represents an information flow between two nodes. The information flow may represent the disclosure and/or access of information (e.g., column values). An edge has a directionality which may be unidirectional or bidirectional. In one or more embodiments, a unidirectional edge indicates that the information flow occurs in a specific direction when a predicate is satisfied. In contrast, a bidirectional edge may indicate that the information flow is unconditional (e.g., independent of the satisfaction of any predicate) and/or may occur in either direction. For example, the predicate may include a query component corresponding to a node (e.g., a node whose node type is "predicate"). A node corresponding to a table may be dependent on the satisfaction of a predicate, as represented by a unidirectional edge originating from the node corresponding to the table and terminating on the node corresponding to the predicate. For example, FIG. 4B shows an example information flow graph (420) that includes a unidirectional edge from table X node (426) corresponding to table X, to predicate B node (428B) corresponding to the predicate ON T1.a=X.x. The example information flow graph (420) similarly includes a unidirectional edge from table T3 node (434) corresponding to table T3 to predicate A node (428A) corresponding to the predicate ON X.x=X.y.

In one or more embodiments, the directionality of an edge is based on a node type of one or more nodes connected by the edge. Thus, the directionality of an edge represents semantic information about the query. For example, an INNER JOIN SQL statement identifies rows that have matching values of a shared column in both the left and right tables, which means that the nodes corresponding to the left and right tables are mutually dependent. Thus, a bidirectional edge may be placed between the INNER JOIN node and the nodes corresponding to the left and right tables. As another example, a FULL JOIN SQL statement identifies rows that have matching values of a shared column in either of the left and right tables, which means that the information flows from the left and right tables are conditional information flows. Thus, a unidirectional edge may be placed between the FULL JOIN node and the nodes corresponding to the left and right tables.

For example, FIG. 4B shows a bidirectional edge from table T2 node (432) corresponding to table T2 to innermost JOIN node (430) corresponding to the innermost JOIN statement because a left join receives (e.g., is influenced by) all rows in the "left" table T2, independent of the satisfaction of any predicate.

Figure 1B:
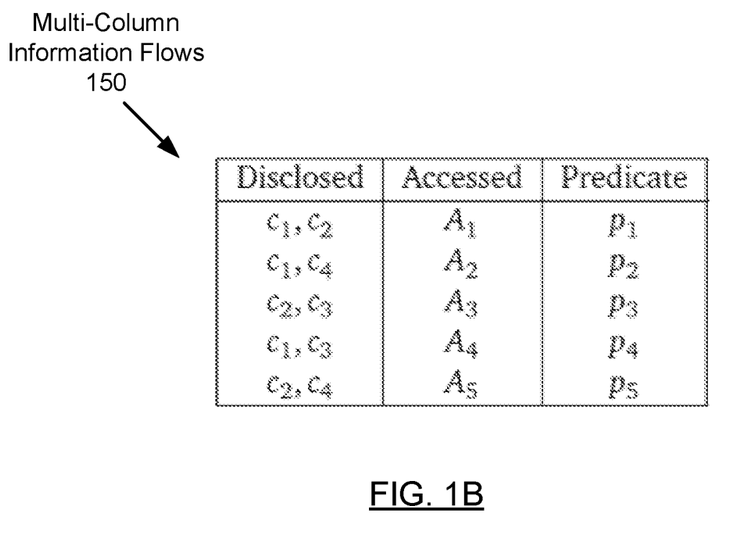

In one or more embodiments, an information flow may be mapped from a multi-column information flow to a single-column information flow. A multi-column information flow includes a set of disclosed columns, a set of accessed columns, and a predicate. For example, information flow I (120I) of FIG. 1A is represented as a multi-column information flow. In addition, FIG. 1B shows examples of multi-column information flows (150). For example, the first row of the multi-column information flows (150) indicates that columns $c_1$ and $c_2$ are disclosed when the set of columns in $A_1$ is accessible and the predicate $p_1$ is satisfied.

Figure 1C:
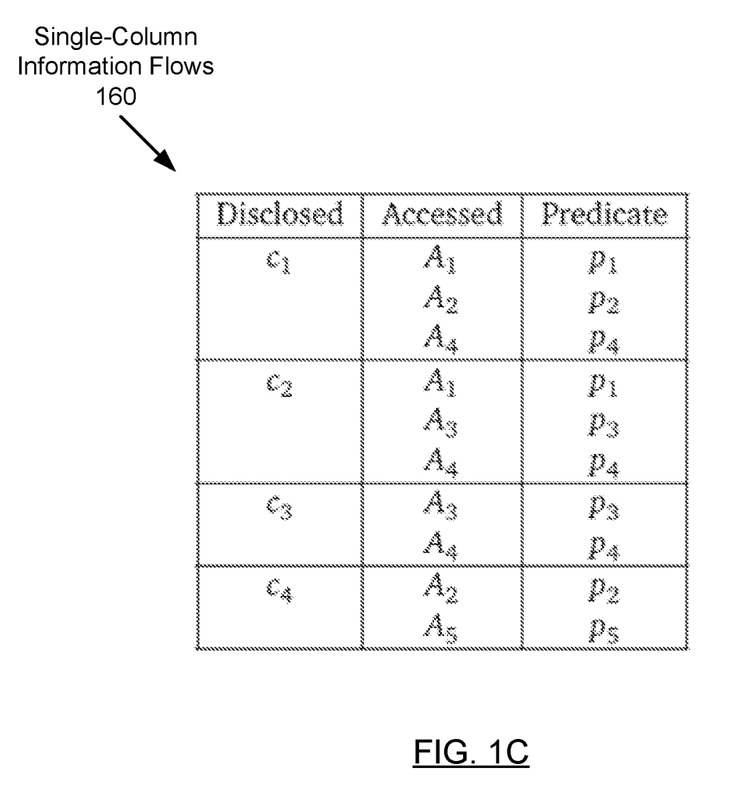

In contrast, a single-column information flow includes, for a single disclosed column in a subset of multi-column information flows, one or more pairs each including a set of accessed columns and a predicate. FIG. 1C shows examples of single-column information flows (160). For example, the third row of the single-column information flows (160) indicates that column $c_3$ may be disclosed when predicate is $p_3$ is true and the set of columns in $A_3$ are accessible, or when predicate is $p_4$ is true and the set of columns in $A_4$ are accessible.

Single-column information flows may be used as building blocks within a filter with the capability to reason about whether a target query that includes arbitrary combinations of columns include a security vulnerability. For example, the arbitrary combinations of columns may be included in a derived table formed by nested JOIN statements that combine the results of multiple sub-queries.

Returning to FIG. 1A, the query analyzer (108) includes functionality to determine an information flow for a query using an information flow graph. The query analyzer (108) includes functionality to compare information flows for a target query (114) and a permitted query (112) to determine whether the target query (114) includes a security vulnerability (134).

The query analyzer (108) includes a graph constructor (128) and an alias resolver (130). The graph constructor (128) includes functionality to construct an information flow graph (e.g., 118A, 118N) for a query. The alias resolver (130) includes functionality to resolve (e.g., map) an alias for a table to a table identifier. Similarly, the alias resolver (130) includes functionality to resolve an alias for a column to a column identifier.

The user computing system (102) may be a mobile device (e.g., phone, tablet, digital assistant, laptop, etc.) or any other computing device (e.g., desktop, terminal, workstation, etc.) with a computer processor (not shown) and memory (not shown) capable of running computer software. The user computing system (102) includes functionality to execute code (132) to generate a target query (114). The code (132) is a collection of statements (e.g., computer instructions) written in source code of a human-readable programming language. The user computing system (102) includes functionality to send the target query (114) to the query analyzer (108). The query analyzer (108) includes functionality to send a security vulnerability (134) to the user computing system (102) in response to receiving the target query (114).

In one or more embodiments, the computer processor(s) (110) takes the form of the computer processor(s) (502) described with respect to FIG. 5A and the accompanying description below. In one or more embodiments, the computer processor (110) includes functionality to execute the query analyzer (108).

While FIG. 1A shows a configuration of components, other configurations may be used without departing from the scope of the invention. For example, various components may be combined to create a single component. As another example, the functionality performed by a single component may be performed by two or more components.

Figure 2:
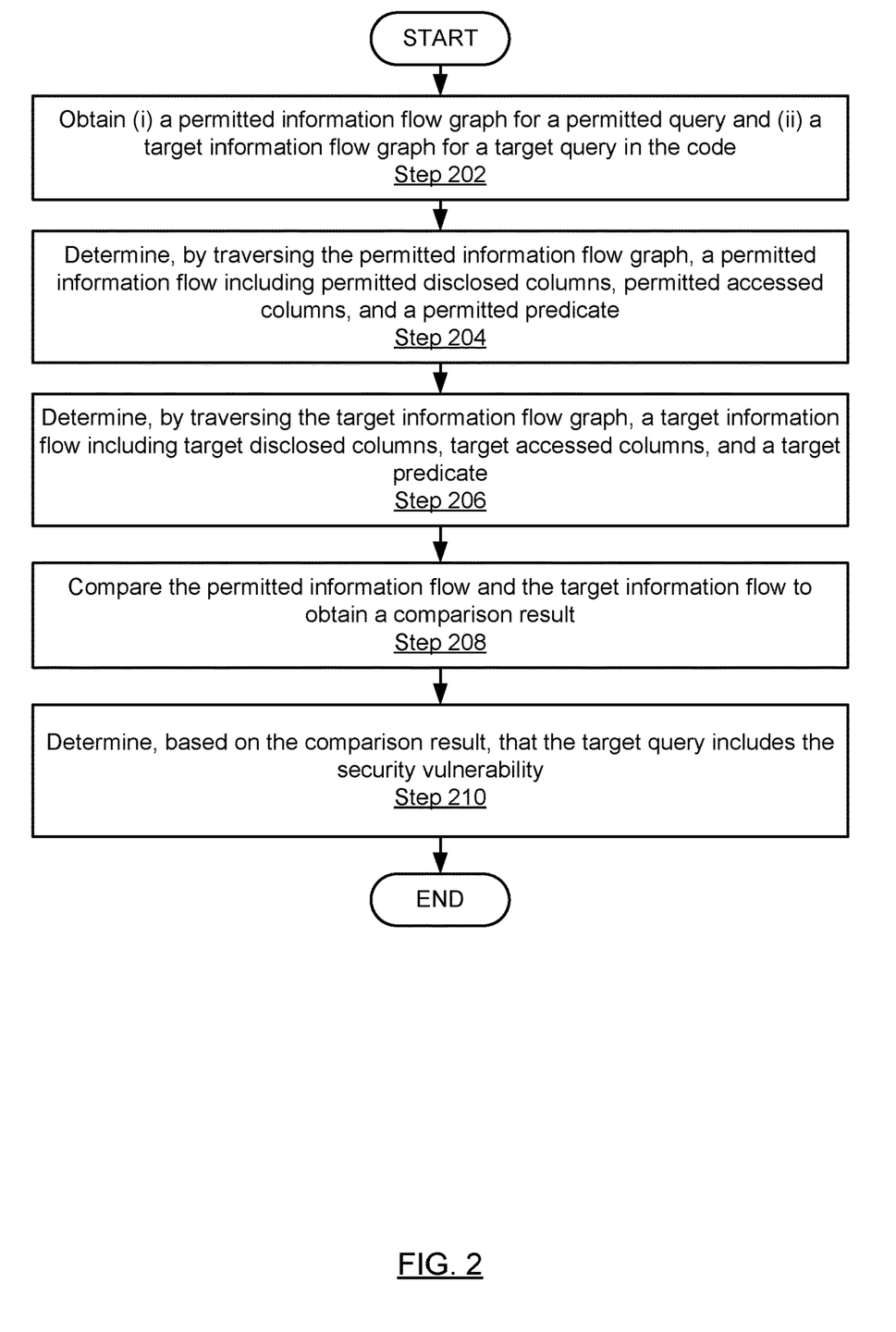
FIG. 2 and FIG. 3 show flowcharts in accordance with one or more embodiments of the invention.

FIG. 2 shows a flowchart in accordance with one or more embodiments of the invention. The flowchart depicts a process for detecting a security vulnerability in code. One or more of the steps in FIG. 2 may be performed by the components (e.g., the query analyzer (108) of the back-end computing system (104) and/or the user computing system (102), discussed above in reference to FIG. 1A). In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, a permitted information flow graph is obtained for a permitted query and a target information flow graph is obtained for a target query in the code. The graph constructor may construct the permitted information flow graph by parsing an abstract syntax tree (AST) obtained for the permitted query. For example, the AST may be generated by a query parser (e.g., an SQL query parser). The graph constructor may construct the permitted information flow graph by traversing the AST and performing the following:

1) Add, to the permitted information flow graph, information flow nodes corresponding to a subset of the AST nodes. For example, an AST node may correspond to a component of the permitted query. Each information flow node has a node type corresponding to a type of component of the permitted query. For example, the node type may correspond to a table, predicate, statement, clause, etc. of the permitted query.
2) Add, to the permitted information flow graph, edges each connecting a pair of information flow nodes.
3) Determine, for each edge, a directionality based on the node type of one or more of the information flow nodes connected to the edge. For example, the directionality may be unidirectional when information flows across the edge in a single direction (e.g., when a predicate is satisfied). Alternatively, the directionality may be bidirectional when information flows across the edge in either direction, or flows across the edge unconditionally, independent of the satisfaction of a predicate.

Similarly, the graph constructor may construct the target information flow graph by parsing an AST obtained for the target query and performing 1), 2) and 3) above while traversing the AST obtained for the target query.

In Step 204, a permitted information flow including permitted disclosed columns, permitted accessed columns, and a permitted predicate is determined by traversing the permitted information flow graph. The directionality of the edges connecting the nodes of the permitted information flow graph indicates the paths of information flow. By traversing the nodes of the permitted information flow graph according to the directionality of the edges, the query analyzer may determine whether a value of a column flows to information flow nodes corresponding to different components of the permitted query.

The values of the permitted disclosed columns may be outputs returned by the permitted query. For example, the output of the example query (400) shown in FIG. 4A is the result returned by the outermost SELECT statement (402). The result returned by the innermost SELECT statement (404) is accessible by the outermost SELECT statement (402). However, the result of the innermost SELECT statement (404) is not disclosed as an output of the example query (400).

In one or more embodiments, the permitted query includes one or more aliases for table identifiers and/or column identifiers. For example, in FIG. 4A, the results of the derived table returned by executing the innermost SELECT statement (404) of the example query (400) are aliased as table "X," as indicated by the clause "AS X." FIG. 4A also shows that the outermost SELECT statement (402) returns the values of aliased columns X.x and X.y of aliased table X. FIG. 4A further shows that the innermost SELECT statement (404) aliases column T2.b as "x" and aliases column T3.c as "y."

The query analyzer may traverse the example information flow graph (420) of FIG. 4B to determine an information flow for the tables and/or columns referenced in the example query (400) of FIG. 4A. See discussion of FIG. 4B below. The information flows for the tables and columns referenced in the example information flow graph (420) of FIG. 4B and the example query (400) of FIG. 4A are summarized in the example information flow (450) of FIG. 4C.

In one or more embodiments, the query analyzer may automatically simplify a predicate (e.g., a predicate included in the permitted query or the target query). For example, the query may be automatically synthesized from a template, which may result in the query including one or more logically redundant expressions. As one example, the query SELECT c FROM t WHERE (1=1) AND p includes a redundant expression 1=1. Thus the predicate may be simplified to p by removing the redundant expression. In one or more embodiments, the query analyzer may use the Z3 solver to generate a canonical form for a predicate.

In Step 206, a target information flow including target disclosed columns, target accessed columns, and a target predicate is determined by traversing the target information flow graph (see description of Step 204 above).

In Step 208, the permitted information flow and the target information flow are compared to obtain a comparison result. The query analyzer may compare the permitted information flow and the target information flow by determining whether the information flow security criteria below are satisfied:

1) the disclosed columns of the target query are a subset of the disclosed columns of the permitted query;
2) the accessed columns of the target query are a subset of the accessed columns of the permitted query; and
3) the predicate of the target query implies the predicate of the permitted query.

In Step 210, it is determined that the target query includes the security vulnerability based on the comparison result. The query analyzer may determine that the target query includes the security vulnerability when at least one of the information flow security criteria is violated. For example, the information flow security criteria may be violated when:

1) the target disclosed columns are not a subset of the permitted disclosed columns;
2) the target accessed columns are not a subset of the permitted accessed columns; or 3) the target predicate fails to imply the permitted predicate.

Figure 4C:
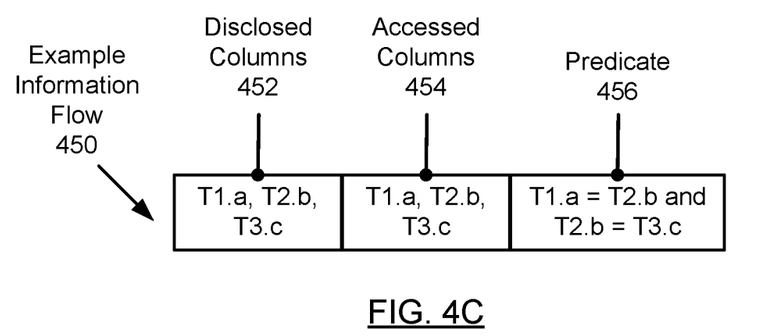
Figure 4D:
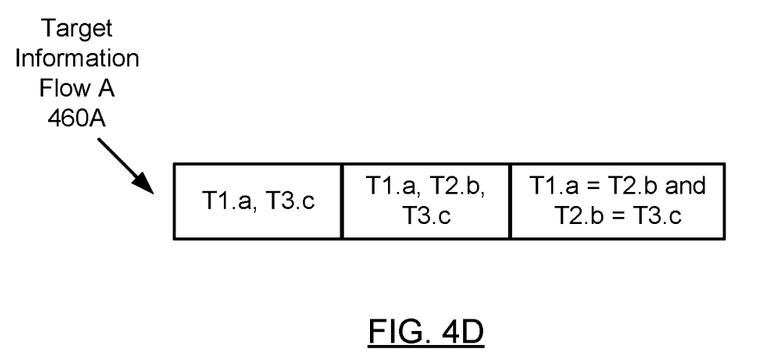
Figure 4E:
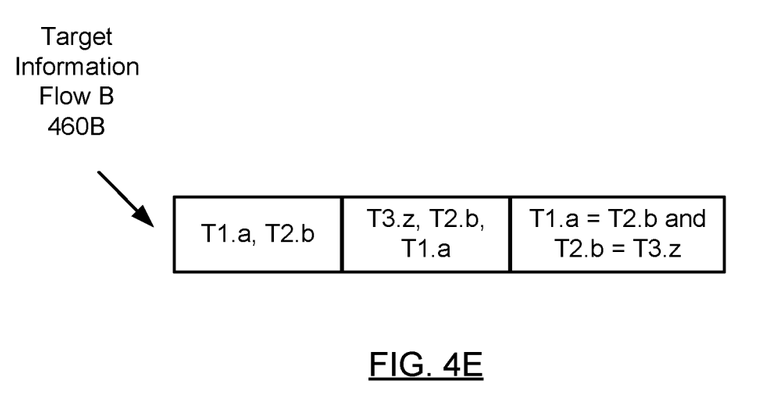

FIGS. 4D and 4E show examples of target information flows that are compared to a permitted information flow (e.g., where the permitted information flow is the example information flow (450) of FIG. 4C).

Figure 3:
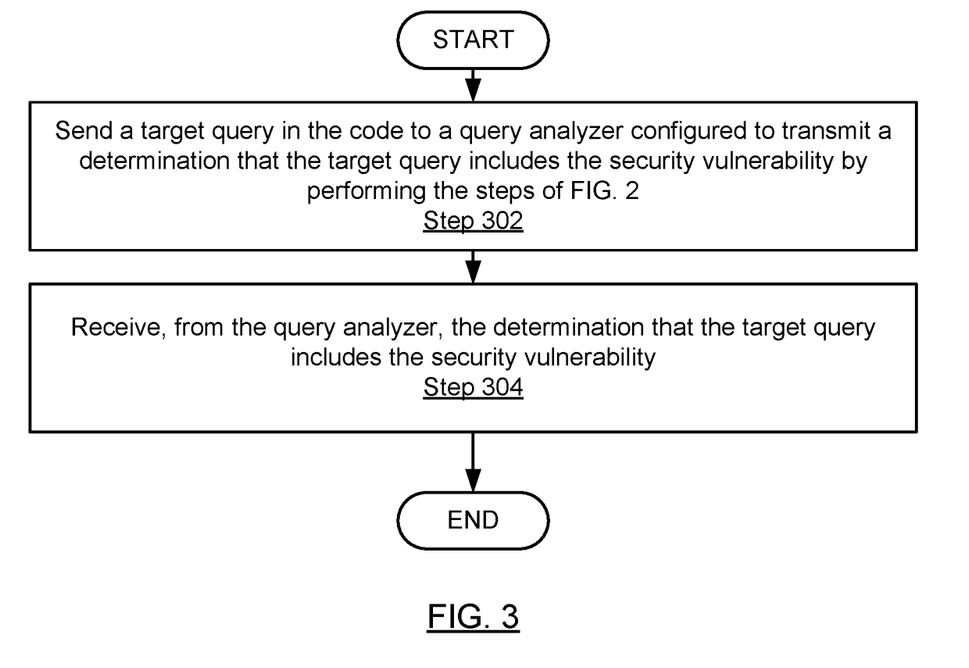

FIG. 3 shows a flowchart in accordance with one or more embodiments of the invention. The flowchart depicts a process for detecting a security vulnerability in code. One or more of the steps in FIG. 3 may be performed by the components (e.g., the query analyzer (108) of the back-end computing system (104) and/or the user computing system (102), discussed above in reference to FIG. 1A). In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

In Step 302, a target query in the code is sent to a query analyzer configured to transmit a determination that the target query includes the security vulnerability by performing the steps of FIG. 2. The target query may be sent to the query analyzer via a network.

In Step 304, the determination that the target query comprises the security vulnerability is received from the query analyzer. The determination that the target query includes the security vulnerability may be received from the query analyzer via the network.

FIG. 4A, FIG. 4B, FIG. 4C, and FIG. 4D show implementation examples in accordance with one or more embodiments. The implementation examples are for explanatory purposes only and not intended to limit the scope of the invention. One skilled in the art will appreciate that implementation of embodiments of the invention may take various forms and still be within the scope of the invention.

As previously discussed, FIG. 4A shows an example query (400) ((112, 114) in FIG. 1A). The example query (400) is used as a permitted query whose corresponding information flow shown in FIG. 4C is compared to information flows of target queries shown in FIGS. 4D and 4E. As previously discussed, FIG. 4B shows an example information flow graph (420) ((118A, 118B) in FIG. 1A) generated for the example query (400) of FIG. 4A. The query analyzer traverses the example information flow graph (420) starting at Table T1 node (424) and determines that column T1.a of Table T1 is disclosed unconditionally. That is, the disclosure of column T1.a by Table T1 does not depend on the satisfaction of a predicate. For example, there is no predicate node connected to Table T1 node (424). Column T1.a is included in the result returned by the outermost SELECT node (422), which corresponds to the outermost SELECT statement (402) of FIG. 4A.

Because a column may not be disclosed without being accessed, the information flow for Table T1 and column T1.a is:
  1) Disclosed columns: T1.a;
  2) Accessed columns: T1.a; and
  3) Predicate: none.

The query analyzer may traverse the example information flow graph (420) starting at Table T2 node (432) and determine that Table T2 discloses and/or accesses the aliased column X.x. For example, the query analyzer may resolve the aliased column X.x to column T2.b based on traversing a subgraph of the example information flow graph (420) that includes one or more alias information flow nodes (e.g., table X node (426) which corresponds to the "AS X" clause in the example query (400)). Alternatively, the query analyzer may resolve the aliased column X.x to column T2.b directly based on examining one or more AS clauses in the example query (400). To disclose and access column T2.b, Table T2 also accesses column T1.a in order to check whether the predicate T1.a=T2.b is satisfied.

Thus the information flow for Table T2 and column T2.b is:
  1) Disclosed columns: T2.b;
  2) Accessed columns: T2.b, T1.a; and
  3) Predicate: T1.a=T2.b.

The query analyzer may traverse the example information flow graph (420) starting at Table T3 node (434), and determine that Table T3 discloses the aliased column X.y. The query analyzer resolves the aliased column X.y to column T3.c. To disclose and access column T3.c, Table T3 also accesses column T1.a and column T2.b in order to check whether the predicate T1.a=T2.b and T2.b=T3.c are satisfied.

Thus the information flow for Table TE and column T3.c is:
  1) Disclosed columns: T3.c;
  2) Accessed columns: T3.c, T2.b, T1.a; and
  3) Predicate: T1.a=T2.b and T2.b=T3.c.

As previously discussed, FIG. 4C shows an example information flow (450) ((120I, 120X, 120K, 120Z) in FIG. 1A and (150, 160) in FIG. 1B) for the example information flow graph (420) of FIG. 4B. The example information flow (450) includes disclosed columns (452) ((122) in FIG. 1A), accessed columns (454) ((124) in FIG. 1A), and a predicate (456) ((126) in FIG. 1A).

FIG. 4D and FIG. 4E show examples of target information flows (460A, 460B). The query analyzer compares the target information flows (460A, 460B). with the example information flow (450) of FIG. 4C to determine whether the target information flows (460A, 460B) are benign or potentially malicious. That is, the example information flow (450) plays the role of permitted information flow.

When comparing target information flow A (460A) to the example information flow (450) the query analyzer determines the following:
  1) the disclosed columns of target information flow A (460A) are a subset of the disclosed columns of the example information flow (450);
  2) the accessed columns of target information flow A (460A) are a subset of the accessed columns of the example information flow (450); and
  3) the predicate of target information flow A (460A) implies the predicate of the example information flow (450).

Thus, the query analyzer determines that target information flow A (460A) is benign.

In contrast, when comparing target information flow B (460B) to the example information flow (450) the query analyzer determines the following:
  1) the disclosed columns of target information flow B (460B) are a subset of the disclosed columns of the example information flow (450),
  2) the accessed columns of target information flow B (460B) are not a subset of the accessed columns of the example information flow (450), and
  3) the predicate of target information flow B (460B) does not imply the predicate of the example information flow (450).

In contrast, when comparing target information flow B (460B) to the example information flow (450) the query analyzer determines the following:
1) The disclosed columns of target information flow B (460B) are a subset of the disclosed columns of the example information flow (450).
2) The accessed columns of target information flow B (460B) are not a subset of the accessed columns of the example information flow (450). That is, the accessed columns of target information flow B (460B) include the column T3.z which is not in the accessed columns of the example information flow (450).
3) The predicate of target information flow B (460B) does not imply the predicate of the example information flow (450). That is, the predicate of target information flow B (460B) does not imply the T2.b=T3.c portion of the predicate of the example information flow (450).

Thus, the query analyzer determines that target information flow B (460B) is potentially malicious.

Embodiments disclosed herein may be implemented on a computing system specifically designed to achieve an improved technological result. When implemented in a computing system, the features and elements of this disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5A:
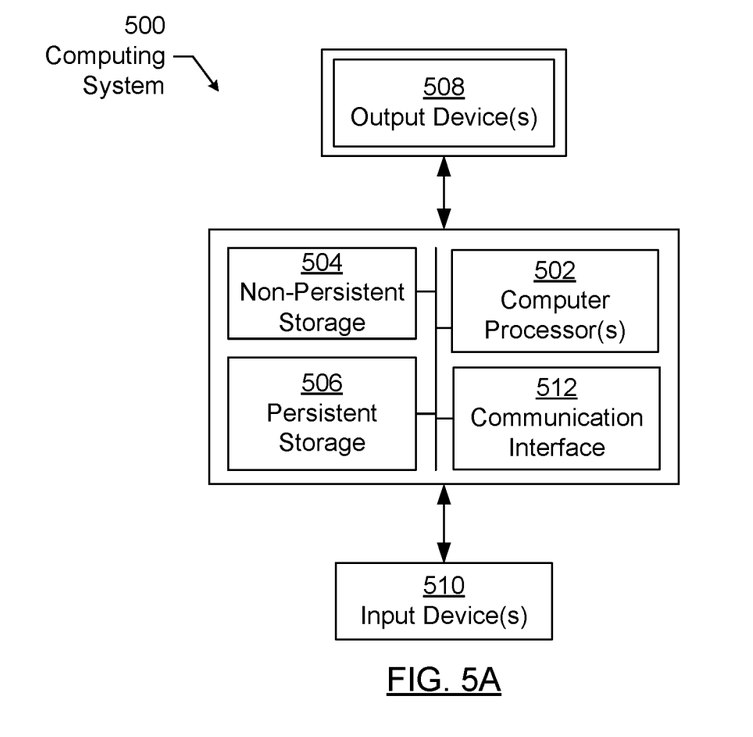
FIG. 5A and FIG. 5B show computing systems in accordance with one or more embodiments of the invention.
Figure 5B:
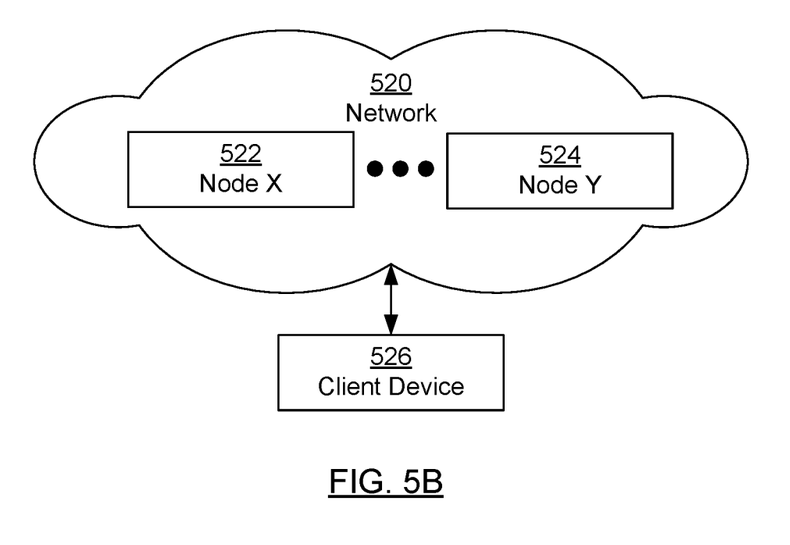

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for detecting a security vulnerability in code, comprising:
   obtaining (i) a permitted information flow graph for a permitted query and (ii) a target information flow graph for a target query in the code;
   determining, by traversing the permitted information flow graph, a permitted information flow comprising a plurality of permitted disclosed columns, a plurality of permitted accessed columns, and a permitted predicate;
   determining, by traversing the target information flow graph, a target information flow comprising a plurality of target disclosed columns, a plurality of target accessed columns, and a target predicate;
   comparing the permitted information flow and the target information flow to obtain a comparison result; and
   determining, based on the comparison result, that the target query comprises the security vulnerability.

2. The method of claim 1, wherein comparing the permitted information flow and the target information comprises at least one selected from a group consisting of:
   determining that the plurality of target disclosed columns is not a subset of the plurality of permitted disclosed columns,
   determining that the plurality of target accessed columns is not a subset of the plurality of permitted accessed columns, and
   determining that the target predicate fails to imply the permitted predicate.

3. The method of claim 1, further comprising:
   obtaining, for the target query and by traversing the target information flow graph, a plurality of target information flows each comprising a plurality of target disclosed columns, a plurality of target accessed columns, and a target predicate; and
   mapping a subset of the plurality of target information flows to a single-column information flow comprising, for a target disclosed column in the subset of the plurality of target information flows, one or more pairs each comprising a plurality of target accessed columns and a target predicate.

4. The method of claim 1, wherein obtaining the target information flow graph comprises:
   obtaining, for the target query, an abstract syntax tree (AST) comprising a plurality of AST nodes corresponding to a plurality of components of the target query;
   adding, to the target information flow graph, a plurality of information flow nodes corresponding to a subset of the plurality of AST nodes, wherein each information flow node of the plurality of information flow nodes has a node type corresponding to a type of component of the target query,
adding, to the target information flow graph, a plurality of edges each connecting a pair of information flow nodes, and
determining, for a first edge of the plurality of edges, a first directionality based on semantics of a first node type of a first information flow node of the plurality of information flow nodes connected to the first edge.

5. The method of claim 4, wherein the first information flow node has an inner join type, and wherein the first directionality is bidirectional.

6. The method of claim 5, further comprising:
determining, for a second edge of the plurality of edges, a second directionality based on semantics of a second node type of a second information flow node of the plurality of information flow nodes connected to the second edge.

7. The method of claim 6, wherein the second information flow node has a predicate type, and wherein the second directionality is unidirectional.

8. The method of claim 1, wherein the target query comprises an alias for a component of the target query, the method further comprising:
resolving the alias by traversing a subgraph of the target information flow graph; and
determining, based on the resolving, that a target disclosed column of the plurality of target disclosed columns is accessible by the component.

9. A system for detecting a security vulnerability in code, comprising:
a repository configured to store:
a permitted information flow graph,
a target information flow graph for a target query in the code,
a permitted information flow comprising a plurality of permitted disclosed columns, a plurality of permitted accessed columns, and a permitted predicate, and
a target information flow comprising a plurality of target disclosed columns, a plurality of target accessed columns, and a target predicate;
a computer processor; and
a query analyzer executing on the computer processor configured to:
determine, by traversing the permitted information flow graph, the permitted information flow,
determine, by traversing the target information flow graph, the target information flow,
compare the permitted information flow and the target information flow to obtain a comparison result, and
determine, based on the comparison result, that the target query comprises the security vulnerability.

10. The system of claim 9, wherein comparing the permitted information flow and the target information comprises at least one selected from a group consisting of:
determining that the plurality of target disclosed columns is not a subset of the plurality of target disclosed columns,
determining that the plurality of target accessed columns is not a subset of the plurality of target accessed columns, and
determining that the target predicate fails to imply the permitted predicate.

11. The system of claim 9, wherein the query analyzer is further configured to:
obtain, for the target query and by traversing the target information flow graph, a plurality of target information flows each comprising a plurality of target disclosed columns, a plurality of target accessed columns, and a target predicate, and
map a subset of the plurality of target information flows to a single-column information flow comprising, for a target disclosed column in the subset of the plurality of target information flows, one or more pairs each comprising a plurality of target accessed columns and a target predicate.

12. The system of claim 9, further comprising a graph constructor executing on the computer processor configured to:
obtain, for the target query, an abstract syntax tree (AST) comprising a plurality of AST nodes corresponding to a plurality of components of the target query,
add, to the target information flow graph, a plurality of information flow nodes corresponding to a subset of the plurality of AST nodes, wherein each information flow node of the plurality of information flow nodes has a node type corresponding to a type of component of the target query,
add, to the target information flow graph, a plurality of edges each connecting a pair of information flow nodes, and
determine, for a first edge of the plurality of edges, a first directionality based on semantics of a first node type of a first information flow node of the plurality of information flow nodes connected to the first edge.

13. The system of claim 12, wherein the first information flow node has an inner join type, and wherein the first directionality is bidirectional.

14. The system of claim 13, wherein the graph constructor is further configured to:
determine, for a second edge of the plurality of edges, a second directionality based on semantics of a second node type of a second information flow node of the plurality of information flow nodes connected to the second edge.

15. The system of claim 14, wherein the second information flow node has a predicate type, and wherein the second directionality is unidirectional.

16. The system of claim 9, wherein the target query comprises an alias for a component of the target query, and wherein the query analyzer is further configured to:
resolve the alias by traversing a subgraph of the target information flow graph, and
determine, based on resolving the alias, that a target disclosed column of the plurality of target disclosed columns is accessible by the component.

17. A method for detecting a security vulnerability in code, comprising:
sending a target query in the code to a query analyzer configured to perform:
obtaining (i) a permitted information flow graph for a permitted query and (ii) a target information flow graph for the target query,
determining, by traversing the permitted information flow graph, a permitted information flow comprising a plurality of permitted disclosed columns, a plurality of permitted accessed columns, and a permitted predicate,
determining, by traversing the target information flow graph, a target information flow comprising a plurality of target disclosed columns, a plurality of target accessed columns, and a target predicate, comparing the permitted information flow and the target information flow to obtain a comparison result, making a determination, based on the comparison result, that the target query comprises the security vulnerability, and transmitting the determination that the target query comprises the security vulnerability; and receiving, from the query analyzer, the determination that the target query comprises the security vulnerability.

18. The method of claim 17, wherein comparing the permitted information flow and the target information comprises at least one selected from a group consisting of:

determining that the plurality of target disclosed columns is not a subset of the plurality of permitted disclosed columns, determining that the plurality of target accessed columns is not a subset of the plurality of permitted accessed columns, and determining that the target predicate fails to imply the permitted predicate.

19. The method of claim 17, wherein the query analyzer is further configured to perform:

obtaining, for the target query and by traversing the target information flow graph, a plurality of target information flows each comprising a plurality of target disclosed columns, a plurality of target accessed columns, and a target predicate; and mapping a subset of the plurality of target information flows to a single-column information flow comprising, for a target disclosed column in the subset of the plurality of target information flows, one or more pairs each comprising a plurality of target accessed columns and a target predicate.

20. The method of claim 17, wherein obtaining the target information flow graph comprises:

obtaining, for the target query, an abstract syntax tree (AST) comprising a plurality of AST nodes corresponding to a plurality of components of the target query;

adding, to the target information flow graph, a plurality of information flow nodes corresponding to a subset of the plurality of AST nodes, wherein each information flow node of the plurality of information flow nodes has a node type corresponding to a type of component of the target query, adding, to the target information flow graph, a plurality of edges each connecting a pair of information flow nodes, and determining, for a first edge of the plurality of edges, a first directionality based on semantics of a first node type of a first information flow node of the plurality of information flow nodes connected to the first edge.

* * * * *